April 28, 1936. P. E. CATE 2,038,525
AUTOMATIC SOLDERING MACHINE
Original Filed Sept. 2, 1932  4 Sheets-Sheet 4
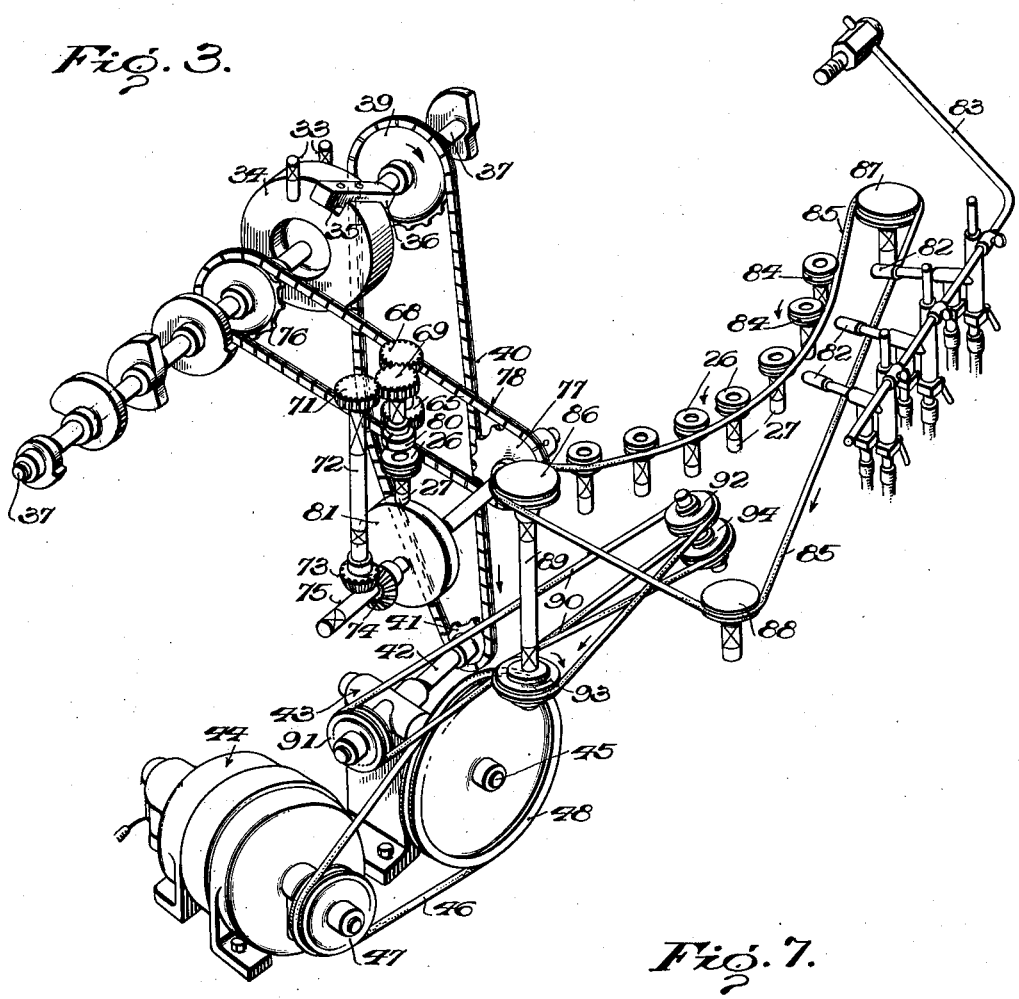
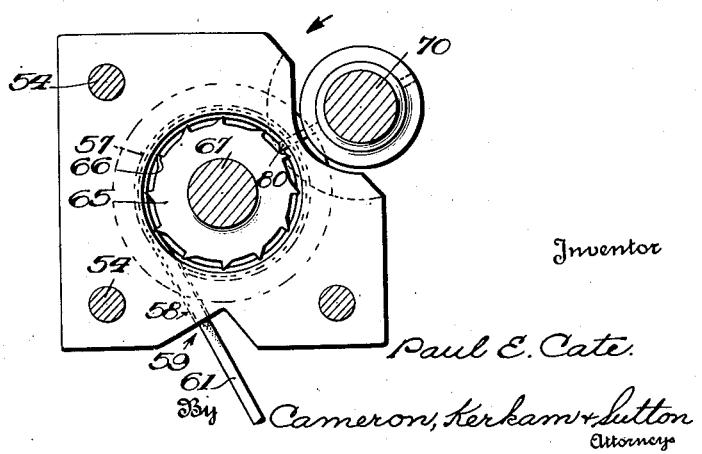

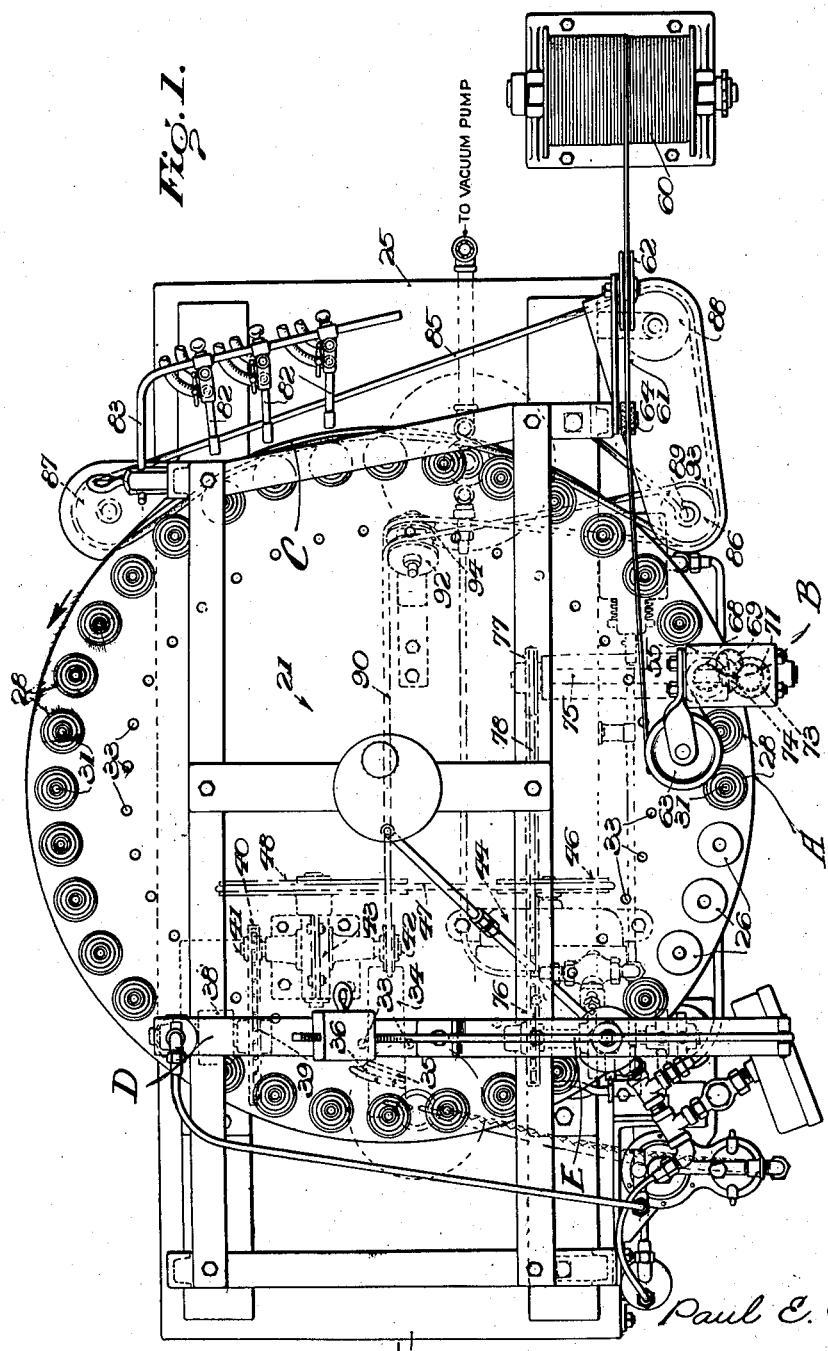

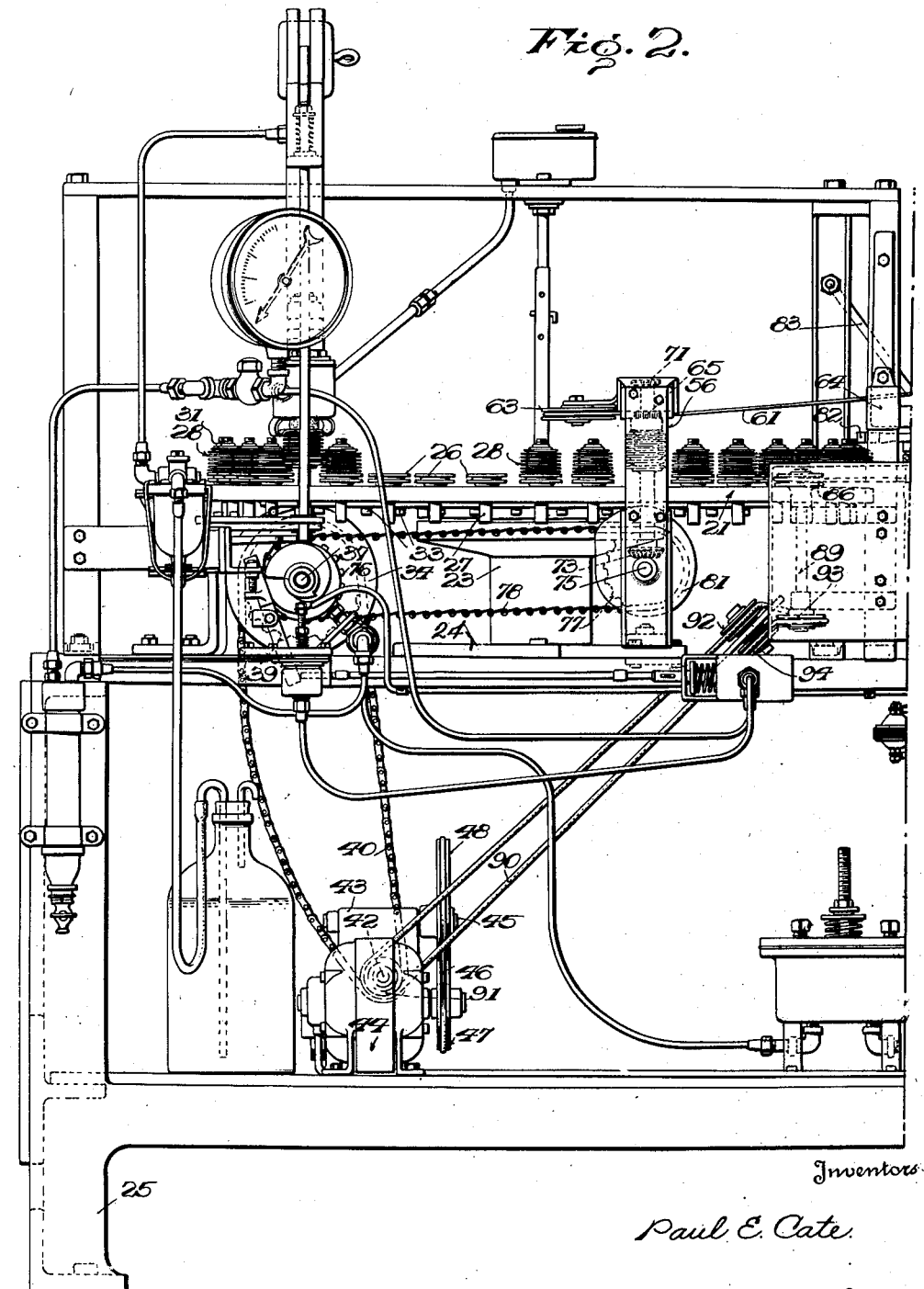

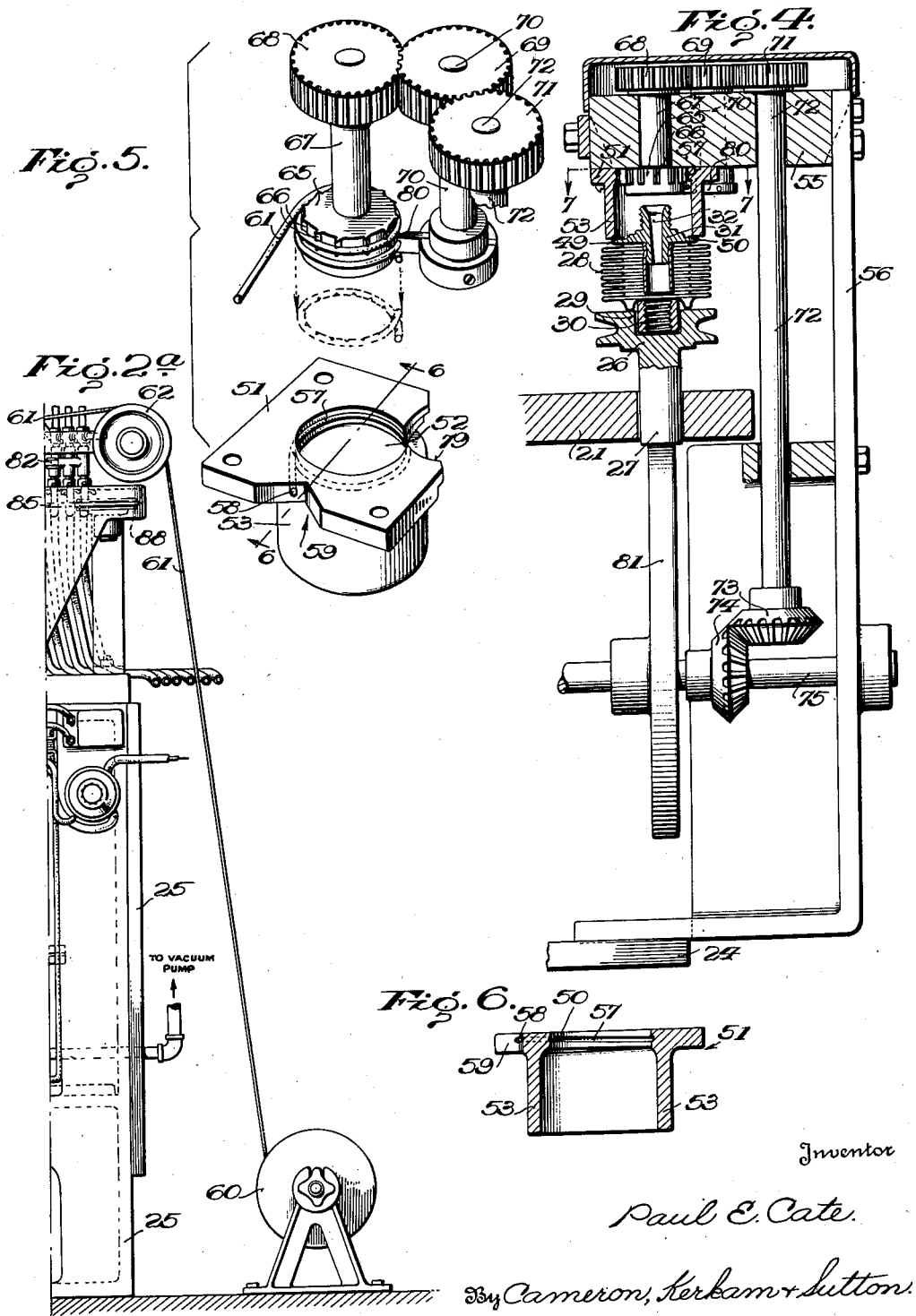

Patented Apr. 28, 1936

2,038,525

UNITED STATES PATENT OFFICE 2,038,525

AUTOMATIC SOLDERING MACHINE

Paul E. Cate, Knoxville, Tenn., assignor to The Fulton Sylphon Company, Knoxville, Tenn., a corporation of Delaware Original application September 2, 1932, Serial No. 631,597. Divided and this application December 7, 1933, Serial No. 701,405

17 Claims. (Cl. 113—59)

This invention relates to devices for attaching heads to vessels, particularly of the expansible and collapsible or bellows type, the present application being a division of my application Serial No. 631,597, filed September 2, 1932.

One of the objects of this invention is to provide a machine of novel construction which is capable of operating automatically upon a succession of vessels or bellows to solder the heads to the bodies thereof in a rapid and efficient manner.

Another object of this invention is to provide a machine of the character described which forms rings of solder, deposits them on the heads of the vessels or bellows, and then heats the solder to complete the seal, all in timed advance with the progress of the vessels or bellows through the machine.

Another object of this invention is to provide a machine of the type last characterized with means for rotating the vessels or bellows as they pass in cooperative relation with the heating means so as to effect a uniform distribution of the heat with respect thereto.

Another object of this invention is to provide a novel mechanism for forming rings of solder and depositing the same upon the heads of the vessels or bellows. Other objects will appear as the description of the invention proceeds.

The invention is capable of receiving a variety of mechanical expressions, one of which is shown on the accompanying drawings, but it is to be expressly understood that the drawings are for the purpose of illustration only and are not to be construed as definitions of the limits of the invention, reference being had to the appended claims for that purpose.

Referring now to the drawings, wherein like reference characters indicate like parts throughout the several views:

Fig. 1 is a plan view of a unitary bellows handling machine constituting one embodiment of the present invention;

Figs. 2 and 2a, when joined together, constitute a side elevation of the embodiment of Fig. 1;

Fig. 3 is a skeletonized perspective view of so much of the mechanism as involves the devices that effect the soldering operation;

Fig. 4 is a vertical sectional view, with certain parts shown in full, of the solder ring forming mechanism of the machine disclosed in Fig. 1;

Fig. 5 is a drawn-out perspective view of the principal elements of the mechanism of Fig. 4;

Fig. 6 is a vertical sectional view of the solder ring forming block taken substantially on line 6—6 of Fig. 5; and Fig. 7 is a horizontal sectional view taken substantially on line 7—7 of Fig. 4.

There is disclosed in the drawings a unitary self-contained bellows handling machine of novel construction which is capable of soldering the heads of bellows to the bodies thereof, filling the bellows with measured charges of a suitable liquid, increasing or decreasing the pressure within the bellows and finally sealing the same in a rapid and efficient manner, all of said operations being performed upon a succession of bellows which are advanced through the machine in timed relation with the operation of the various soldering, filling, pressure varying and sealing mechanisms. The machine includes a movable carrier, here shown as a rotatable table, on which are mounted a plurality of bellows seat members each of which is adapted to support a bellows having a body and an upwardly extending head with an orifice therein, and various devices positioned adjacent to or above the path of movement of the bellows on said carrier for performing the soldering, filling, pressure varying and sealing operations.

In the embodiment illustrated, the carrier or table is moved intermittently to advance the successive bellows to positions adjacent to or beneath the various mechanisms, the latter being so located as to coincide with at-rest positions of the bellows seat members. As the carrier comes to rest with the bellows beneath the various mechanisms, the seat members are moved or raised so as to bring the bellows into close cooperative relationship with the respective mechanisms. The complete machine thus provided is capable of automatic and continuous operation, and handles bellows in a far more rapid and efficient manner than any of the devices previously known to the art.

Referring now to Figs. 1-3, the bellows handling machine of the present invention may embody a movable carrier in the form of a table 21 rotatably supported as by suitable ball bearings on a pedestal 23 which is in turn suitably mounted on the top plate 24 of a supporting framework 25. Table 21 carries at circumferentially spaced points about its periphery a plurality of seat members or fixtures 26 each of which is provided with a downwardly extending stem or pin 27 projecting through and beneath table 21 in position to be engaged by means later to be described for raising or lifting seat members 26 to bring the bellows supported thereon into engagement with the soldering, filling and sealing mechanisms. Each of seat members 26 is adapted to support a bellows or other vessel 28 and, as shown best in Fig. 4, may be provided with a recess 29 designed to receive an attaching block 30 projecting from the head of bellows 28. Each of bellows 28 is provided with the usual corrugated body portion and an upwardly extending head 31 in which there is formed a suitable tapered orifice 32 through which the bellows may be charged, and its pressure increased or decreased as desired.

Spaced at intervals about the periphery of table 21, and preferably located immediately above the path of travel of bellows 28, are the various mechanisms for performing the soldering, filling or charging, pressure varying and sealing operations upon the successive bellows as they are advanced through the machine. The stations at which the various operations are performed have been indicated generally by the reference characters A, B, C, D, and E. At station A empty, unsealed bellows, the upper heads 31 of which are secured to the bodies only by the engagement of the upper corrugations with the flanges of the heads, are placed upon seat members 26 either by any suitable mechanical means or by an operator located at this station. At station B rings of solder are formed and cut from a suitable supply of wire solder and are deposited one at a time upon the heads 31 of bellows 28, while at station C the solder rings are melted so as to seal the previously fluxed joints between heads 31 and the bodies of bellows 28. At station D a measured amount of any suitable liquid with which it is desired to charge the bellows is introduced into each bellows through orifice 32 of upper head 31. At station E the pressure within the bellows is either increased or decreased, as desired, the machine shown in the drawings being adapted for evacuation of the bellows after the charging operation, and the bellows are finally sealed by driving closure members into orifices 32. As the filled and sealed bellows again apporach station A, they are removed from seat members 26, either mechanically or manually, and, if desired, the closure members may be securely soldered in place.

Any suitable means may be provided for moving carrier or table 21 to advance the successive bellows to the various soldering, charging, evacuating and sealing mechanisms, the embodiment illustrated including a plurality of studs 33 secured to and projecting downwardly from the underside of table 21, and a substantially cylindrical cam 34, shown best in Fig. 3, having a diagonal slot 35 formed in its periphery and a stud engaging arm 36 forming one side of said slot and extending outwardly at one end beyond the side of cam 34 in such position that, as the cam is rotated by main driving shaft 37 upon which it is mounted, the end of arm 36 engages one of studs 33 and forces it to follow groove 35 until it passes therefrom on the opposite side of cam 34, thus rotating table 21 through an angular distance equal to the arc subtended by radii passing through two adjacent studs 33. In the embodiment illustrated, the direction of rotation of table 21 is counterclockwise. Studs 33 are preferably equal in number to the bellows supporting seat members 26, and are spaced at regular intervals at a uniform radius, so that table 21 is intermittently rotated in a proper manner to bring the bellows one after another to positions coincident with the locations of the various mechanisms. It will be noted that studs 33 are spaced apart a distance only slightly greater than the width of cam 34 and thus form a lock with said cam preventing movement of table 21 except when said studs are acted upon by groove 35 of cam 34.

Main driving shaft 37, upon which table turning cam 34 is mounted, may be journaled in suitable bearings 38 beneath table 21 and extends substantially across said table tangent to the circle marking the locus of studs 33. Shaft 37 is adapted to be continuously driven in any suitable manner, the drive illustrated comprising, as shown best in Fig. 3, a sprocket wheel 39 secured to shaft 37, a chain 40 passing around sprocket wheel 39 and another sprocket 41 which is mounted upon the output shaft 42 of a speed reducing device 43, and a motor 44 which drives the input shaft 45 of speed reducer 43 as by a belt 46 and pulleys 47 and 48.

As previously mentioned, when the vessels being handled by the present machine are of the bellows type, they are usually supplied to the machine with the upper heads secured to the bodies only by mechanical engagement of the topmost corrugation 49 with the flange 50 of the head, and although these joints are usually fluxed before the bellows are placed upon seat members 26, it is preferable that they be soldered during the passage of the bellows through the machine. To this end, there is provided at station B suitable mechanism for forming rings of solder and depositing said rings upon the heads of the successive bellows.

As shown in detail in Figs. 4–7, the solder ring forming mechanism includes a ring forming block 51 having a cylindrical bore 52 and a downwardly extending cylindrical guide sleeve 53, said block being secured as by screws or bolts 54 to the underside of a supporting block 55 in such position that bore 52 and sleeve 53 are coaxial with one of the at-rest positions of a bellows seat member 26. The diameters of bore 52 and sleeve 53 are preferably made slightly smaller than that of flanges 50 of the bellows heads. Supporting block 55 may be suitably mounted so as to overhang the path of movement of the bellows as by a bracket 56 secured to top plate 24 of supporting framework 25. Bore 52 of ring forming block 51 is provided with a helical groove 57, substantially semicircular in cross section, the upper end of said groove communicating through a passageway 58 with an outer edge of block 51, preferably cut away to form a V-shaped entrance to said passageway as indicated at 59, while the lower end of said groove is flush with the bottom surface of block 51 and leads directly into the interior of cylindrical guide sleeve 53.

The solder from which the rings are formed in block 51 in a manner later to be described may be supplied to said block in the usual wire form from any suitable source of supply such as a reel 60 (Figs. 1 and 2a) mounted adjacent supporting framework 25, the wire solder 61 leading upwardly from said reel over a guide pulley 62 suitably supported by the superstructure of the supporting framework, and around a second guide pulley 63 mounted on supporting block 55 whence it passes through passageway 58 into helical groove 57. It is preferable that, in its passage to ring forming block 51, wire solder 61 be lubricated in order to facilitate its passage through helical groove 57, and in the form shown it passes through a suitable lubricating device 64 which may contain a felt or other absorbent pad moistened with any suitable lubricant not detrimental to the soldering operation, such a glycerine.

Any suitable means may be provided for continuously feeding wire solder 61 through helical groove 57 so as to convert the straight wire solder into a helical coil such that successive convolutions thereof may be cut off as to form individual split rings of solder. In the form shown, a wheel 65 having sharp teeth 66 projecting outwardly from the upper portion of its periphery is mounted within bore 52 of block 51, the untoothed portion extending downwardly into sleeve 53 and the outer diameter of teeth 66 being such that wheel 65 may rotate freely within bore 52 and yet said teeth may bite into the portion of the surface of wire solder 61 which projects inwardly beyond the confines of groove 57. Wheel 65 is mounted for rotation within bore 52 on a suitable shaft 67 which is journaled in supporting block 55, shaft 67 having secured to its upper end above block 55 a suitable gear 68 which meshes with a similar gear 69 mounted on a shaft 70 likewise journaled in supporting block 55. Gear 69 in turn meshes with another gear 71 secured to the upper end of a shaft 72 which is journaled within supporting block 55 and extends therethrough and downwardly therebelow, just outside the periphery of table 21, terminating in a suitable bevel gear 73 which meshes with a similar gear 74 mounted on a jack shaft 75 extending inwardly under table 21. As shown best in Fig. 3, jack shaft 75 is continuously driven from main driving shaft 37 in any suitable manner as by sprocket wheels 76 and 77 and driving chain 78. With this construction, it will be seen that shaft 67 and toothed wheel 65 are continuously rotated, and due to the biting engagement of teeth 66 with the wire solder the latter is continuously drawn into and fed through helical groove 57.

The mechanism just described forms the solder into a continuous helical coil, and means must therefore be provided for cutting successive convolutions off said coil to form suitable rings which may be deposited upon the successive bellows heads. To this end, ring forming block 51 is cut away, as indicated at 79, on an arc substantially tangent to the surface of bore 52 at a point substantially diametrically opposite the upper end of helical groove 57 so as to provide space for the movement of a suitable knife member 80 which is secured for rotation therewith to the lower end of shaft 70. The length of knife member 80 is so selected that the arc of movement of its cutting edge is substantially tangent to the untoothed portion of the periphery of wheel 65, and said knife member is preferably so positioned on shaft 70 as to lie in a plane below that of the toothed portion of said wheel. Gears 68 and 69 are also preferably of the same size so that knife member 80 and toothed wheel 65 have the same angular speeds of rotation. With this construction the helically coiled wire solder 61 is cut once in every rotation of toothed wheel 65, the locus of the cut being in the second coil of the helix measured from the entrance end of groove 57 and just after the solder leaves the bottom of said groove and enters within cylindrical guide sleeve 53. When the cut is made in this manner the split ring of solder thus formed may drop freely downward within guide sleeve 53 and be deposited upon the upper head 31 of the bellows then positioned beneath the ring forming mechanism.

In order to insure that the rings of solder thus formed are accurately deposited upon the bellows heads in the proper position, suitable means may be provided for moving or lifting each bellows 28 into close cooperative relationship with guide sleeve 53 as said bellows comes to rest beneath the solder ring forming mechanism. In the embodiment illustrated, jack shaft 75 is provided with a suitable cam 81 which is positioned directly below the at-rest position of the stem or pin 27 of the seat member 26 upon which is supported the bellows 28 which is in position to receive a ring of solder. Cam member 81 is so shaped and so positioned on jack shaft 75 that after table 21 comes to rest with a bellows directly beneath the solder ring forming mechanism, the high part of cam 81 engages the bottom end of stem or pin 27 and raises or lifts seat member 26 and the bellows supported thereon until flange 50 of bellows head 31 abuts the lower edge of guide sleeve 53. It then maintains the bellows in that position until knife member 80 severs a split ring of solder from the helical coil formed by groove 57 and said ring drops downwardly within guide sleeve 53 on top of the joint between bellows head 31 and the body of the bellows. Further rotation of cam member 81 then lowers seat member 26 and the supported bellows 28 to their normal positions just before the next movement of carrier or table 21 takes place.

From station B where the split rings of solder are thus formed and deposited upon the successive bellows heads, continued movement of carrier or table 21 advances the bellows to station C where suitable means are provided for melting the solder so as to properly seal the joints between the upper bellows heads and the bellows bodies. As shown best in Figs. 1 and 3, the present embodiment of the machine includes a plurality of gas-air torches 82 of any desired construction, adjustably mounted closely adjacent the path of movement of the bellows, as on a supporting rod or bracket 83 and so positioned as to direct their blasts against the upper bellows heads of the bellows in at-rest positions of the table or carrier 21. Although only three torches 82 have been shown in the drawings, it will be understood that any desired number may be utilized and positioned in any suitable manner.

Since it is desirable that the heat created by the torches 82 be evenly distributed throughout each bellows head, suitable means may be provided for revolving or rotating each bellows upon its axis while it is within the zone of heat created by the torches. In the form shown, each bellows seat member 26 is provided with a circumferential groove 84 which is adapted to be frictionally engaged by a continuously moving belt 85 during the time that the bellows are within the zone of heat created by torches 82. As shown best in Fig. 3, belt 85 is adapted to travel in a substantially triangular path about suitable pulleys 86, 87, and 88, pulleys 86 and 87 being mounted closely adjacent the periphery of table 21 and so located with respect thereto that the run of belt 85 therebetween is in contact with grooves 84 of bellows seat members 26. Pulley 86 is also the driving pulley for belt 85, being secured to a suitable shaft 89 which is continuously driven from output shaft 42 of speed reducing mechanism 43 in any desired manner, as by a continuous belt 90 which passes around a pulley 91 mounted on output shaft 42, an idler pulley 92, a pulley 93 secured to shaft 89, a second idler pulley 94 and thence back to pulley 91. With this construction, it is possible to continuously rotate the bellows about their individual axes, and relatively to the carrier or table, during the entire time that said bellows are within the zone of heat created by the torches.

From station C the vessels or bellows are progressively transferred, in the embodiment illustrated, through the successive stations wherein they are supplied with liquid charges, the pressure therein determined, and a sealing thereof effected, as referred to above and as disclosed in detail in said application Serial No. 631,597 of which this application is a division. It is to be expressly understood, however, that the mechanism herein described and claimed may be associated with other suitable mechanisms than those illustrated and may be incorporated in machines of other construction or character, or be used independently, without departing from the present invention.

It will therefore be perceived that an improved automatic machine has been provided wherein heads may be soldered to vessels or bellows rapidly and efficiently. The rings of solder are formed, deposited and melted in synchronism with the passage of the vessels or bellows through the machine, and the melting is so effected that the heat is distributed uniformly without danger of injuring the vessels or bellows by localized overheating. Improved means for forming and depositing rings of solder have also been provided which are of wide utility as well as simple in construction, rugged and durable in service and highly efficient in operation.

While the embodiment illustrated on the drawings has been described with considerable particularity it is to be expressly understood that the invention is not restricted thereto, as the invention may receive a variety of mechanical expressions, some of which will now readily suggest themselves to those skilled in the art, while changes may be made in the details of construction, arrangement and proportion of parts, and certain features used without other features, without departing from the spirit of this invention. Reference is therefore to be had to the appended claims for a definition of the invention.

What is claimed is:—

1. In a bellows handling machine, a movable carrier adapted to support a plurality of bellows each having a body and an upwardly extending head, means for forming rings of solder and for depositing the same upon said bellows heads, means for moving said carrier to advance said bellows one after another into alignment with said last named means to receive said rings of solder and then through a zone of heat, and means for rotating said bellows as they pass through said zone of heat.

2. In a bellows handling machine, a movable carrier adapted to support a plurality of bellows each having a body and an upwardly extending head, means positioned above the path of movement of said carrier for forming rings of solder and for depositing the same upon said bellows heads, means for moving said carrier to advance said bellows one after another to a position beneath said ring forming means, and means for raising said bellows to bring said heads into cooperative relationship with said ring forming means wherein said rings of solder may be received.

3. In a bellows handling machine, a movable carrier adapted to support a plurality of bellows each having a body and a head, means for progressively advancing said carrier through a plurality of positions, means in alinement with one of said positions for forming and depositing on the bellows head a ring of wire solder, means at one or more of the subsequent positions of the bellows for melting said solder to seal the joint between the body and head, and means for rotating the bellows throughout the period each bellows is subjected to said heating means to distribute the heating effect on the head.

4. In a bellows handling machine, a movable carrier adapted to support a plurality of bellows each having a body and a head, means for progressively advancing said carrier through a plurality of positions, means in alinement with one of said positions for forming and depositing by gravity on the bellows head a ring of wire solder, means movable transversely of the path of movement of said carrier for bringing the bellows head and ring forming means into contiguous relationship to center said ring on said head, and means at one or more of the subsequent positions of the bellows for melting said solder to seal the joint between the body and head.

5. In a bellows handling machine, a movable carrier adapted to support a plurality of bellows each having a body and a head, means for moving said carrier, means for forming a ring of solder above the path of movement of said bellows, means for moving said bellows and ring forming means relatively into a contiguous relationship to center the formed ring on said head, and means operated by said carrier moving means for feeding solder wire through said ring forming means whereby solder rings are formed in synchronism with the advance of said bellows beneath said ring forming means.

6. In a bellows handling machine, a movable carrier adapted to support a plurality of bellows each having a body and a head, means for moving said carrier, means for forming a ring of solder above the path of movement of said bellows, means operated by said carrier moving means for feeding solder wire through said ring forming means whereby solder rings are formed in synchronism with the advance of said bellows beneath said ring forming means, means for severing the formed ring, said ring forming means permitting said rings to drop by gravity as soon as severed, and means operated by said carrier moving means for elevating each bellows into a position contiguous to said ring forming means to receive the severed solder ring in centered relation to the bellows head.

7. In apparatus of the character described, a solder ring forming device including means for supplying wire solder, a member providing a cylindrical guide surface, means for helically coiling said solder and feeding the same to the interior of said cylindrical guide surface, and means for cutting the helically coiled solder into split rings after it has reached said cylindrical guide surface whereby it may drop by gravity after it is severed.

8. In apparatus of the character described, a block having an interior surface with a helical groove therein for coiling solder wire, means for feeding a solder wire into and through said groove to form a ring, and means for severing the formed ring from the advancing wire after it has passed from said groove whereby said ring may drop by gravity.

9. In apparatus of the character described, a solder ring forming device including means for supplying wire solder, a block having a helical passageway formed therein, means for introducing said wire solder into and feeding it through said passageway, and means for cutting into split rings the solder helically coiled in said passageway but after it has left said passageway.

10. In apparatus of the character described, a solder ring forming device including means for supplying wire solder, a block having a helical passageway formed therein, a passageway leading from the outside of said block to said helical passageway through which said wire solder may be fed to the latter, means for feeding said solder through said helical passageway, said block having a cylindrical guide surface to which said passageway leads, and means for cutting into split rings the solder helically coiled in said passageway after it has reached said guide surface.

11. In apparatus of the character described, a solder ring forming device including means for supplying wire solder, a block having a cylindrical bore therein, a helical groove formed in the surface of said bore, means for introducing said wire solder into said groove, a toothed wheel housed within said bore and adapted to bite into the wire solder in said groove, means for rotating said toothed wheel to feed said solder through said groove, and means for cutting the helically coiled solder into split rings.

12. In apparatus of the character described, a solder ring forming device including means for supplying wire solder, a block having a cylindrical bore therein, a helical groove formed in the surface of said bore, means for introducing said wire solder into said groove, a toothed wheel housed within said bore and adapted to bite into the wire solder in said groove, means for rotating said toothed wheel to feed said solder through said groove, and a knife for cutting the helically coiled solder once in every revolution of said toothed wheel.

13. In apparatus of the character described, a solder ring forming device including means for supplying wire solder, a block having a cylindrical bore therein, a helical groove formed in the surface of said bore, means for introducing said wire solder into said groove, a toothed wheel housed within said bore and adapted to bite into the wire solder in said groove, means for rotating said toothed wheel to feed said solder through said groove, a knife rotatably mounted adjacent said toothed wheel, a portion of said block being cut away to permit said knife to engage the periphery of said wheel, and means for rotating said knife in timed relation with said wheel whereby the helically coiled solder is cut by said knife once in every revolution of said wheel.

14. In apparatus of the class described, a movable carrier adapted to support a plurality of vessels, a solder ring forming device located above the path of movement of said vessels including means for supplying wire solder, means for helically coiling said solder and feeding the same out of the coiling means, means for cutting the helically coiled solder into split rings after it has left said coiling means, means for moving said carrier to advance said vessels one by one beneath said device in position to receive one of said rings, and means for actuating said cutting means in timed relation with said carrier moving means so that each ring when cut falls upon a vessel.

15. In apparatus of the class described, a movable carrier adapted to support a plurality of vessels, means for intermittently moving said carrier step by step, a solder ring forming block located above the path of movement of said vessels, a helical passageway formed in said block coaxial with one of the at-rest positions of said vessels, means for introducing wire solder into and feeding it through said passageway, said block having a cylindrical guide surface to which said passageway leads, means for cutting the solder helically coiled in said passageway into split rings after it has reached said guide surface whereby the split ring may drop by gravity, and means for actuating said feeding and cutting means in timed relation with said carrier moving means so that each ring when cut falls upon a vessel.

16. In apparatus of the character described, a movable carrier adapted to support a plurality of bellows each having a body and an upwardly extending head, means for depositing a ring of solder upon each of said bellows heads, means adjacent the path of movement of said carrier for heating said bellows heads to melt said solder rings and seal the joints between said heads and bodies, and means for rotating said bellows upon their axes and relatively to said carrier while the latter moves said bellows through the zone of heat created by said heating means to prevent localized overheating.

17. In apparatus of the character described, a movable carrier, a plurality of seat members mounted on said carrier and each adapted to support a bellows having a body and an upwardly extending head, means for depositing a ring of solder upon each of said bellows heads, means adjacent the path of movement of said carrier for heating said bellows heads to melt said solder rings and seal the joints between said bellows heads and bodies, and means for rotating said seat members relatively to said carrier while the latter moves said bellows through the zone of heat created by said heating means.

PAUL E. CATE.